J. A. McGEE.
MULTIPLE DISK FRICTION CLUTCH.
APPLICATION FILED APR. 28, 1910.

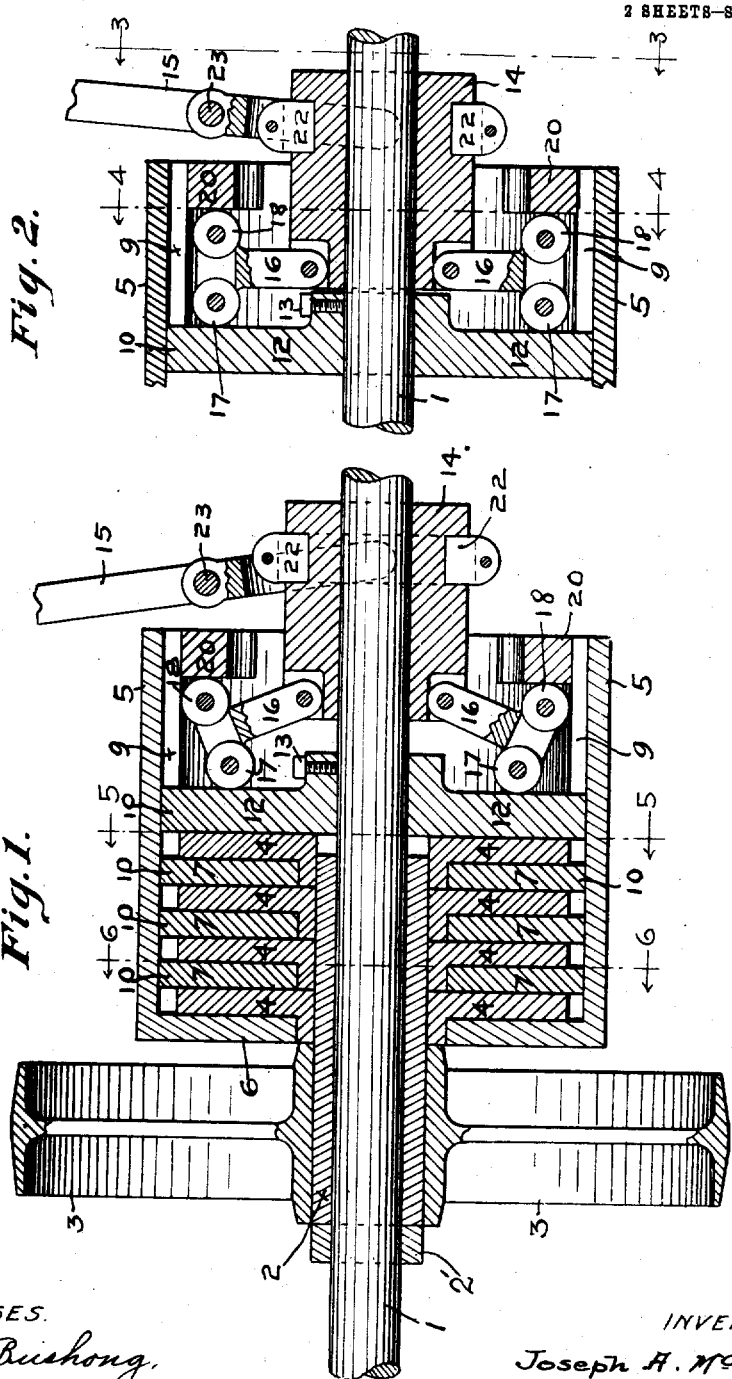

974,101.

Patented Oct. 25, 1910.
2 SHEETS—SHEET 2.

WITNESSES
Wm L. Bushong
L. B. Woerner

INVENTOR.
Joseph A. McGee,
By Minturn & Woerner,
ATTORNEYS.

UNITED STATES PATENT OFFICE.

JOSEPH A. McGEE, OF BIG SPRING, INDIANA.

MULTIPLE-DISK FRICTION-CLUTCH.

974,101.  Specification of Letters Patent.  Patented Oct. 25, 1910.

Application filed April 28, 1910. Serial No. 558,199.

*To all whom it may concern:*

Be it known that I, JOSEPH A. McGEE, a citizen of the United States, residing at Big Spring, in the county of Boone and State of Indiana, have invented certain new and useful Improvements in Multiple-Disk Friction-Clutches, of which the following is a specification.

This invention relates to improvements in a coupling which comprises in its construction a plurality of disks that are brought together with a regulated pressure to produce frictional contact.

The invention may be used on a variety of machines and is especially applicable to automobile construction.

The object of the invention is to provide a simple, durable, and easily operated means for applying regulated pressure to friction disks of a coupling of the above character, which means may be capable of producing great frictional pressure and holding contact when required, but will also be capable of a ready adjustment to secure a looser contact allowing the disks to slip when it is required.

I accomplish the objects of the invention by the mechanism illustrated in the accompanying drawings, in which,—

Figure 3:
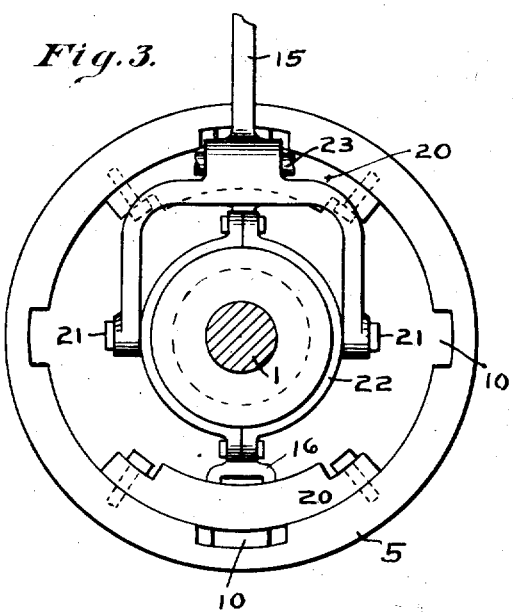
Figure 4:
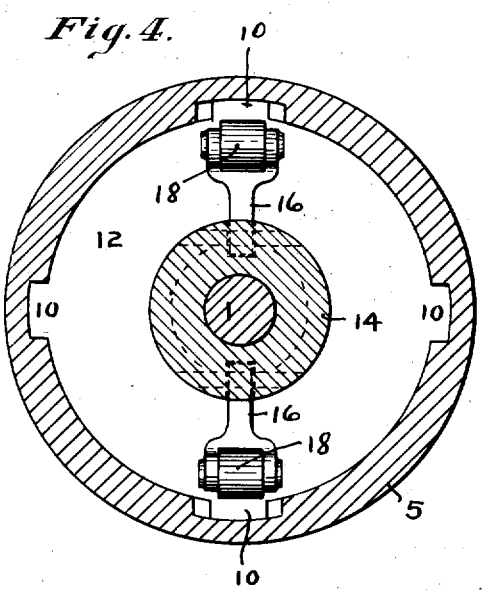
Figure 5:
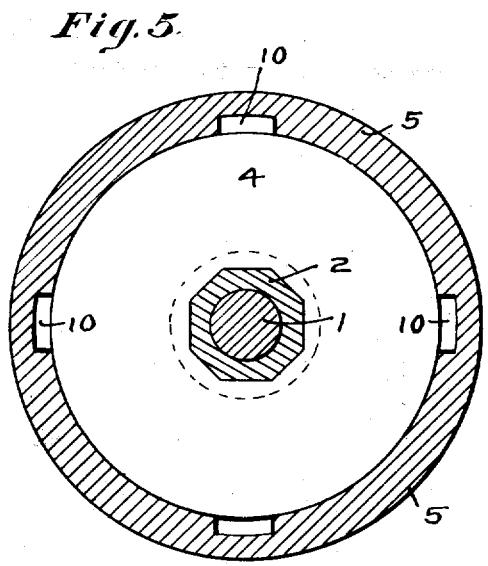
Figure 6:
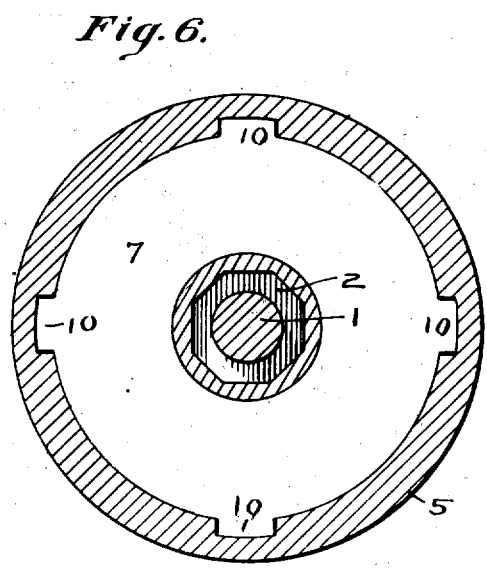

Figure 1 is a vertical section longitudinally and centrally of the shaft on which the coupling is mounted, showing the coupling in its loose or inoperative condition; Fig. 2 is a like section showing the sliding sleeve, and arms pivotally connected therewith, in positions to render the couplings operative; Fig. 3 is a section on the line 3—3 of Fig. 2; Fig. 4 is a section on the line 4—4 of Fig. 2; Fig. 5 is a section on the line 5—5 of Fig. 1; and Fig. 6 is a section on the line 6—6 of Fig. 1.

Like characters of reference indicate like parts throughout the several views of the drawings.

1 is a shaft upon which the coupling is mounted and which is driven by means of any suitable power. (Not shown.) Mounted loosely upon the shaft 1 is a sleeve 2 which is angular in cross-section on its outer sides and is limited in its end-movement by collar 2' on shaft 1. Also mounted upon the sleeve 2 in close contact with each other and rotating with said sleeve are four hubs, each having a circular disk 4.

5 is a cylindrical shell having a head 6, here shown as an integral part of the shell, at one end, said end having a central bore to receive a hub of one of the disks 4. All of the disks 4 are mounted within the shell 5 in the manner shown in Fig. 1. The hubs of the disks 4 all extend in the same direction from their respective disks, and loosely mounted on each hub except the outer one upon which the head 6 is mounted, is a disk 7. Each disk 7 has a pair of diametrically opposite peripheral lugs 10. The cylindrical shell 5 is longitudinally grooved as shown at 9, to receive said peripheral lugs 10 of the disks 7 to compel the disks 7 to rotate with the cylinder.

A head 12 is mounted upon the shaft 1 and is secured thereto in a fixed manner, here shown as by means of the set screw 13. This head 12 is also provided with peripheral lugs 10 which enter the grooves 9 of the cylinder 5 to compel a corresponding rotary movement of said cylinder and head.

A sleeve 14 is slidingly mounted upon the shaft 1 and is movable longitudinally of the shaft by means of a lever 15. The lower end of the lever 15 is bifurcated to straddle the sleeve 14 as shown in Fig. 3, and is pivotally attached to trunnions 21 of the split ring 22. The split ring 22 is mounted in an annular groove in the sliding sleeve 14. The lever 15 is swingingly mounted on a fixed pivot 23. The inner end of the sleeve 14 is diametrically notched to receive the ends of the stems of a pair of T-shaped levers 16 which are pivotally secured at their stem ends to the sleeve 14, in said notches. The outer ends of the levers 16 have the cross-arms, at the ends of which the rollers 17 and 18 are respectively mounted. The rollers 17 bear against the follower-head 12, and the rollers 18 bear against the flanges or blocks 20 secured opposite each lever 16 to the inner wall of the cylindrical shell 5.

When the sleeve 14 is moved inwardly of the cylindrical shell 5 by being slid longitudinally on shaft 1 by the operation of the lever 15, the T-shaped arms 16 approach the positions at right angles to the shaft 1, as shown in Fig. 2, thereby causing the roller 17 to press against the follower-head 12 and move the cylinder longitudinally of the shaft thereby impinging the disks 7 between the disks 4, with more or less force, depending upon the position of the levers 16, thereby causing the sleeve on which the disks are mounted, to be coupled as above described. The pulley 3, which is mounted on sleeve 2, will thereby be correspondingly coupled to the shaft 1. By regulating the pressure and friction between the disks, by means of lever 15, the pulley 3 may be permitted to slip, by the slipping of the disks, or it may be held against slipping by the exercise of sufficient force applied through said lever 15. The inclosure of the cylinder is filled with oil around the disks to thoroughly lubricate the parts and prevent heating.

Having thus fully described my invention, what I claim is new and wish to secure by Letters Patent of the United States, is:—

1. In a clutch, a shaft, a sleeve loosely mounted on the shaft, disks mounted upon and rotating with the sleeve and adjustable longitudinally thereof, a cylindrical shell surrounding said disk having inside longitudinal grooves, a cylinder-head at one end and inwardly projecting flanges at the other end of said cylindrical shell, other disks between said first disks said last disks having peripheral lugs entering the grooves of the cylindrical shell, a fixed head mounted in a fixed manner on the shaft between which and said cylinder-head all of said disks are impinged by a longitudinal movement of said cylindrical shell, a sleeve slidingly mounted on the shaft, T-shaped levers having their stems pivoted to the sleeve and an end of each of the cross-arms thereof bearing against the fixed head and the other end against said inwardly projecting flanges of the cylindrical shell.

2. In a clutch, a shaft, a sleeve loosely mounted on the shaft, disks mounted upon and rotating with the sleeve and adjustable longitudinally thereof, a cylindrical shell surrounding said disk having inside longitudinal grooves, a cylinder-head at one end and inwardly projecting flanges at the other end of said cylindrical shell, other disks between said first disks said last disks having peripheral lugs entering the grooves of the cylindrical shell, a fixed head mounted in a fixed manner on the shaft between which and said cylinder-head all of said disks are impinged by a longitudinal movement of said cylindrical shell, a sleeve slidingly mounted on the shaft, T-shaped levers having their stems pivoted to the sleeve and an end of each of the cross-arms thereof bearing against the fixed head and the other end against said inwardly projecting flanges of the cylindrical shell, and friction rollers mounted in the ends of said cross-arms.

In witness whereof, I have hereunto set my hand and seal at Indianapolis, Indiana, this 12" day of April, A. D. one thousand nine hundred and ten.

JOSEPH A. McGEE. [L. S.]

Witnesses:
GEO. W. OSBORN,
SIMEON COX.